Oct. 20, 1936.  A. C. HOUGLAND  2,057,895
PASTEURIZER
Filed June 6, 1935  3 Sheets-Sheet 1

Fig. 1

INVENTOR
Albert C. Hougland
BY Stryker & Stryker
ATTORNEYS

Oct. 20, 1936.　　　A. C. HOUGLAND　　　2,057,895
PASTEURIZER
Filed June 6, 1935　　　3 Sheets-Sheet 2
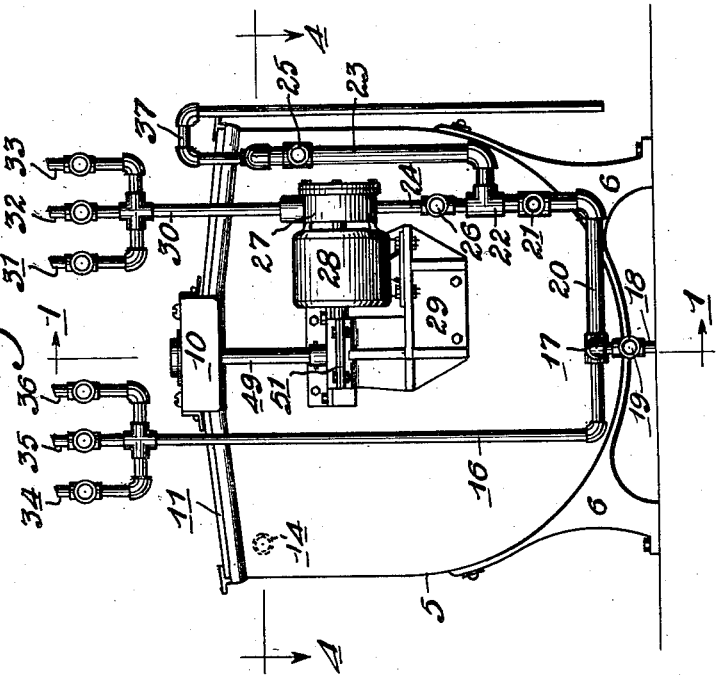
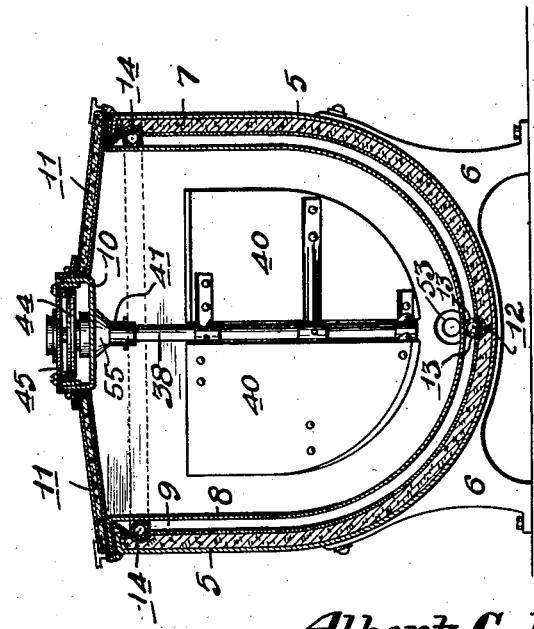
INVENTOR
Albert C. Hougland
BY
ATTORNEYS

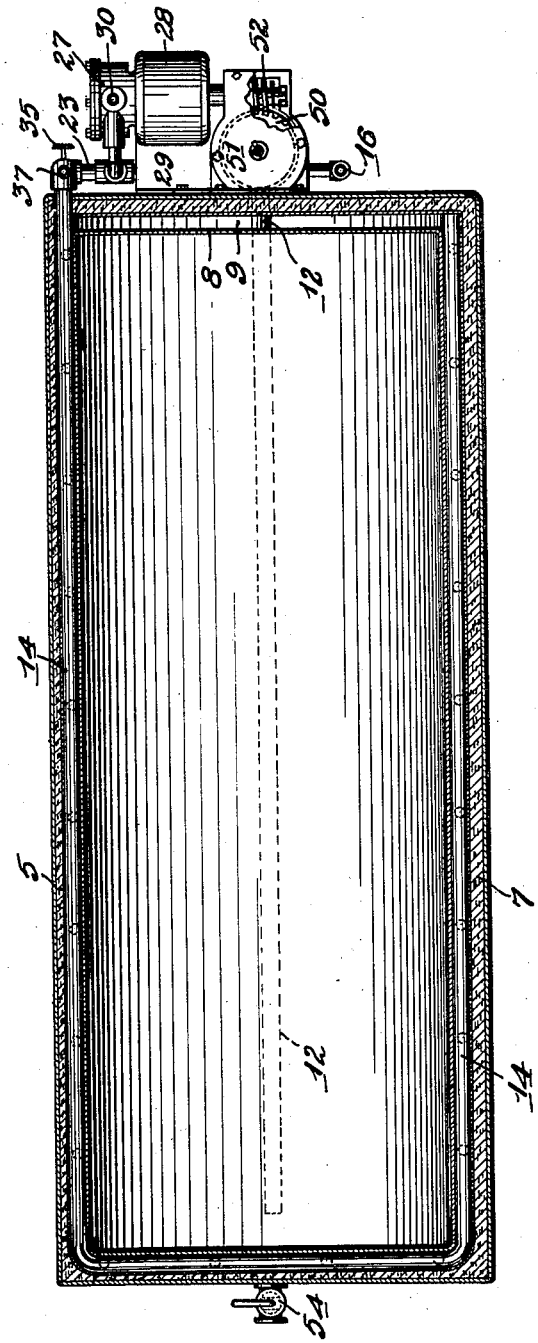

Patented Oct. 20, 1936

2,057,895

UNITED STATES PATENT OFFICE 2,057,895

PASTEURIZER

Albert C. Hougland, St. Paul, Minn., assignor to Crane Company of Minnesota, St. Paul, Minn., a corporation of Minnesota Application June 6, 1935, Serial No. 25,307

5 Claims. (Cl. 257—108)

It is an object of this invention to provide a novel and inexpensive pasteurizer particularly, although not exclusively, for dairy products, wherein the product to be treated is protected against contamination by lubricants and other matter which ordinarily lodges in the bearings submerged in the product during the treatment.

Another object is to provide a pasteurizer in which the liquid to be treated is agitated by means of a novel arrangement of stirring members suspended from the top and arranged to be readily removed for cleaning.

A further object is to provide a novel pasteurizer of the horizontal vat type having spaced walls and connections for rapidly circulating heating and cooling liquids between such walls.

Other objects will appear and be more fully pointed out in the following specification and claims.

Referring to the accompanying drawings which illustrate the best form of my device at present known to me:

Figure 1 is a central, vertical, longitudinal section through my improved pasteurizer, taken on the line 1—1 of Fig. 3;

Fig. 2 is a cross section taken on the line 2—2 of Fig. 1;

Fig. 3 is an end view of the machine; and

Fig. 4 is a horizontal section taken on the line 4—4 of Fig. 3.

I provide a long, narrow vat indicated generally by the numeral 5 extending horizontally and supported on suitable legs 6. The bottom of the vat is semi-cylindrical in shape and the sides, ends, bottom and top contain heat insulating material indicated by the numeral 7. This insulating material is enclosed between sheet metal casings on its inner and outer surfaces. A lining 8, preferably constructed from stainless sheet steel or the like, is spaced from the inner surface of the sides, ends and bottom of the vat to afford a jacket space 9 for the heating and cooling liquids.

Extending centrally along the top of the vat is a housing 10 for the stirring mechanism hereinafter described. Connected by hinges to this housing at each side is a door 11 or removable top extending from end to end of the vat and adapted to allow ready access to the interior for cleaning and other purposes. An inlet pipe 12 extends longitudinally within the jacket space 9 at the bottom thereof. This pipe has a multiplicity of spaced openings 13 therein to distribute the heating and cooling liquids in the jacket space and extending around the top of the jacket space is an outlet pipe 14 which is also perforated at suitable intervals to receive the liquid.

The inlet pipe 12, as best shown in Fig. 1, communicates with a T-fitting 15 on the exterior of the vat and this fitting is connected to a liquid supply pipe 16 and a steam injector 17. Steam is supplied to the injector through a pipe 18 having a control valve 19 and water or other liquid may be admitted at the side of the injector through a pipe 20 under control of a valve 21. As best shown in Fig. 3, the pipe 20 communicates with a T-fitting 22 affording connections with branch pipes 23 and 24 respectively under control of valves 25 and 26. The pipe 23 connects with the outlet pipe 14 and the pipe 24 with the inlet for a power-driven pump 27 which is directly driven by a motor 28 mounted on a bracket 29 on one end of the vat. An outlet 30 for the pump 27 has branches 31, 32 and 33 adapted to be connected to brine, cold water and hot water containers. The pipe 16 has similar branches 34, 35 and 36 connected to the brine, cold water and hot water supplies respectively. An overflow pipe 37 is connected to the pipe 14 to permit the escape of condensate during the use of the steam injector 17.

Vertical shafts 38 and 39 are suspended from their upper ends in the vat and mounted on these shafts are pairs of blades 40 adapted to stir and circulate the liquid to be treated around the walls of the vat and also to raise the liquid from the bottom. The upper ends of the shafts 38 and 39 fit in power-driven sockets 41 and are readily removable therefrom for cleaning. In the embodiment illustrated a catch of the bayonet type is employed to connect the upper ends of the shafts to the sockets. Suitable anti-friction bearings are provided for the sockets 41. These bearings are mounted in the housing 10 above and below pulleys 42, 43 and 44. The pulleys 42 and 43 are fixed on the socket 41 supporting the shaft 39 and the pulley 44 is secured to the socket supporting the shaft 38. A cup shaped, conical baffle 55 is fixed on each of the sockets 41 beneath the bearings therefor to guard against the passage of contaminating matter or lubricant down to the shafts 38 and 39.

A cover plate 45 is removably secured to the housing 10 to allow access to mechanism therein. A belt 46 is trained on the pulleys 43 and 44 and a belt 47 is trained on the pulley 42 and on a pulley 48. The latter pulley is fixed on a vertical drive shaft 49 having bearings in the housing 10 and arranged to be driven by a worm gear 50 in a housing 51. This housing also contains a worm 52 fixed on the shaft of the motor 28 for driving the worm wheel 50.

As shown in Fig. 1, an outlet conduit 53 for the liquid to be treated communicates with the bottom of the vat at its end remote from the motor and has a valve 54 exterior of the vat.

*Operation*

In operation, the liquid to be treated is introduced into the vat through one of the doors 11 and the jacket space is filled with water by opening the valve controlling the pipe 35. Now the motor 28 is operated and if the steam jet circulating system is to be used the valve on pipe 35 and valve 26 are closed and the valves 19, 21 and 25 opened. The injector 17 forcibly circulates and heats the water in the jacket, the water being forced into the pipe 12 which distributes it and causes it to pass upward in the jacket and back to the injector through the pipes 14, 23 and 20. The motor 28 operates the agitating blades on the shafts 38 and 39 through the connections including the belts 46 and 47, shaft 49 and worm gearing in the housing 51. The shafts 38 and 39 are driven at a slow speed so that the contents of the vat are constantly agitated while the temperature of the liquid is raised and maintained at pasteurizing temperature for the desired period of time. Condensate from the steam injected through the pipe 18 overflows through the pipe 37 during this operation.

Upon completion of the pasteurizing treatment it is desirable to reduce the temperature of the liquid in the vat quickly. This is accomplished by closing the valves 19 and 21 and opening the valves controlling the pipes 32 and 35 and also the valve 26. Cold water is thus admitted from the pipe 16 to the pipe 12 from which it is distributed in the jacket space and is pumped out through the pipes 14, 23, 24, 30 and 32 while the pump 27 is operated by the motor 28. To further reduce the temperature, the water may be first removed from the vat by opening the valve 21 and valve controlling the pipe 32 and by closing the valve 25 while operating the pump 27. Brine is then caused to circulate through the jacket space 9 by closing the valve 21 and valve in pipe 32 and by opening the valves controlling the pipes 31 and 34. Now brine is drawn into the jacket from the pipe 34, passes through pipes 16 and 12, thence upward in the jacket to the pipe 14 and out through the pipes 23, 24, 30 and 31. When the temperature of the liquid in the vat has been reduced to the desired low point, it is withdrawn from the vat by opening the valve 54 on the conduit 53.

When the vat is to be cleansed after use the agitating blades 40 and shafts 38 and 39 may be quickly and easily removed from the vat through one of the doors 11 so that there are no obstructions to interfere with the work and cleaning of the agitators is facilitated. Sanitation is further promoted by my construction which avoids all packing glands and bearings submerged in the liquid to be treated. Obviously, the bearings for the shafts 38 and 39 and their rotary sockets 41 are located above the level of the liquid to be treated in the vat and lubricant from the bearings in the housing 10 is prevented from reaching the contents of the vat by my arangement of the conical baffles or cups 55 fixed on the sockets 41, as indicated in Fig. 1.

Where a supply of hot water is available the pasteurizing may be accomplished without the injector 17. Thus, by suitable manipulation of the valves including those controlling the pipes 33 and 36, hot water may be circulated by the pump 27 through the connecting pipes and jacket space, as in the cases of the cold water and brine.

Having described my invention, what I claim as new and desire to protect by Letters Patent is:

1. Heat transfer apparatus comprising a long, relatively narrow and horizontally extending vat provided with an insulated outer casing, an inner casing spaced from said outer casing to form a jacket space for liquid, piping arranged to circulate liquid in said jacket space, stirring mechanism mounted on the top of said vat and having a plurality of vertical shafts depending therefrom into said vat, means for removably securing said shafts to said mechanism on the top of said vat, stirring blades mounted on said shafts, power-driven means for rotating said shafts and means for forcing heating liquid through said piping and jacket space.

2. In a pasteurizer for dairy products a long, relatively narrow and horizontally extending vat having an insulated outer casing and an inner casing spaced from said outer casing to form a jacket space for liquid, an insulated door on the top of said vat, inlet and outlet pipes for circulating liquid in said jacket space, a plurality of vertically disposed shafts depending from the top of said vat, stirring blades mounted on said shafts, means for rotating said shafts, means removably supporting said shafts in said vat to permit ready removal of the same through said door and means for forcibly circulating cooling and heating liquids in said jacket space through said pipes.

3. In a pasteurizer for dairy products a long, relatively narrow and horizontally extending vat having an insulated outer casing and an inner casing spaced from said outer casing to form a jacket space for liquid, said vat having top openings extending from end to end thereof, insulated doors for closing said openings, inlet and outlet pipes for circulating liquid in said jacket space, a housing for stirring mechanism extending between said doors along the top of said vat, a plurality of vertically disposed shafts depending from said housing, stirring blades mounted on said shafts, means for actuating said stirring mechanism, said shafts being readily detachable from said stirring mechanism to permit ready removal of said shafts and blades through said doors and means for forcibly circulating cooling and heating liquids in said jacket space through said pipes.

4. In a pasteurizer for dairy products, a long relatively narrow and horizontally extending vat having a semi-cylindrical bottom and provided with an inner casing forming a jacket space for heating and cooling liquids, an inlet pipe extending longitudinally in said space at the bottom of the vat, an outlet pipe extending longitudinally in said space near the top thereof, said inlet and outlet pipes having a multiplicity of spaced perforations therein to distribute the heating and cooling liquids in said space, branch pipes communicating with said inlet pipe for admitting cooling and heating liquids respectively thereto, branch outlet pipes communicating with said first mentioned outlet pipe for disposing of said heating and cooling liquids respectively, stirring mechanism mounted in said vat and a motor operatively connected to said stirring mechanism.

5. In a pasteurizer for dairy products, a long relatively narrow and horizontally extending vat having an outer casing, an inner casing spaced from said outer casing to form a jacket space for heating and cooling liquids, an inlet pipe extending longitudinally in said space at the bottom of the vat, an outlet pipe extending longitudinally in said space near the top thereof, said inlet and outlet pipes having a multiplicity of spaced perforations therein to distribute the heating and cooling liquids in said space, branch pipes communicating with said inlet pipe for admitting cooling and heating liquids respectively thereto, branch outlet pipes communicating with said first mentioned outlet pipe for disposing of said heating and cooling liquids respectively, stirring mechanism removably depending from the top of said vat, a motor operatively connected to said stirring mechanism and a pump operatively connected to said motor for forcibly circulating said heating and cooling liquids in said jacket space.

ALBERT C. HOUGLAND.